Oct. 2, 1962
J. M. WILLIAMS
3,056,200
TELESCOPING KNIFE AND FORK IMPLEMENT
Filed Jan. 11, 1962
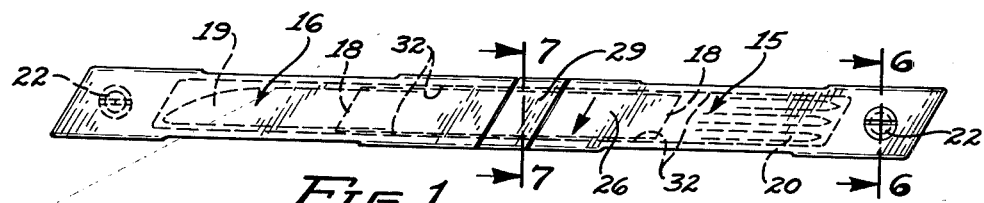
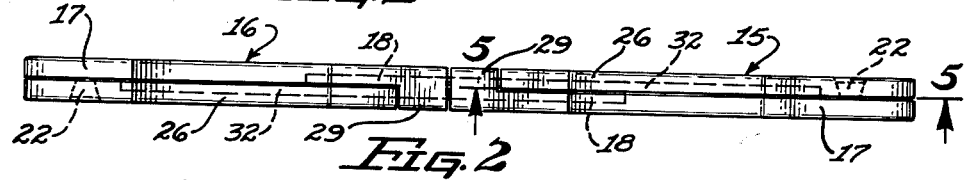
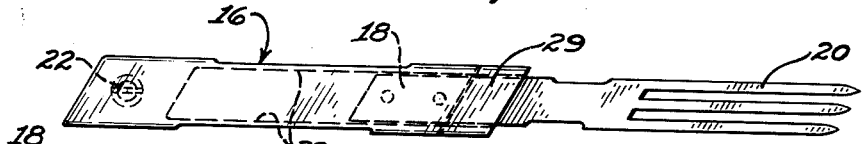
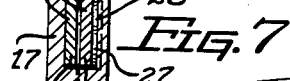
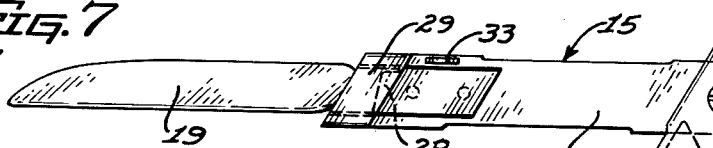
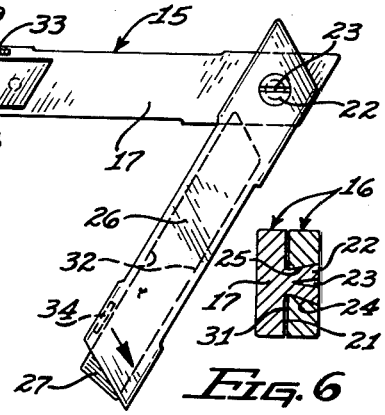
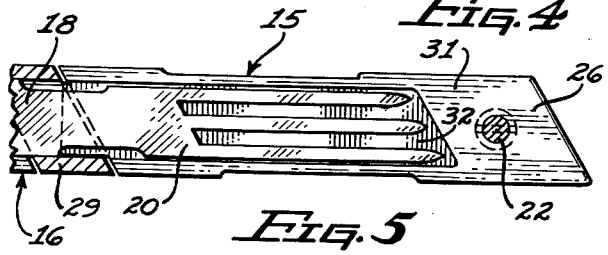
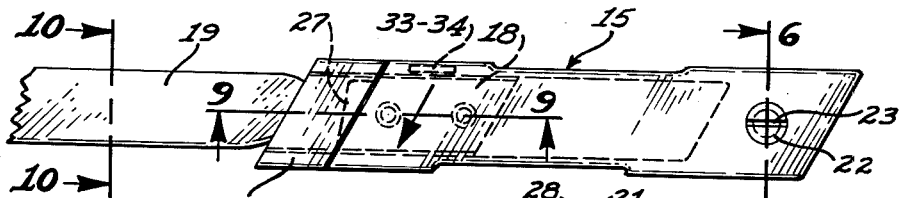
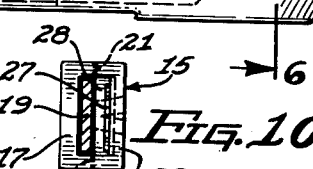
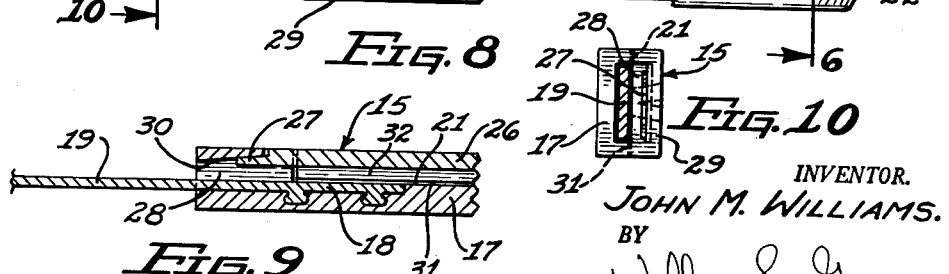
INVENTOR.
JOHN M. WILLIAMS.
BY
Willard S. Grout
ATTORNEY.

United States Patent Office 3,056,200
Patented Oct. 2, 1962

3,056,200
TELESCOPING KNIFE AND FORK IMPLEMENT
John M. Williams, 1133 W. Roeser Road,
Phoenix 41, Ariz.
Filed Jan. 11, 1962, Ser. No. 165,496
4 Claims. (Cl. 30—148)

This invention relates to an implement having telescoping knife and fork elements particularly adapted for use in connection with camping, fishing, hunting and other allied outdoor sports.

One of the objects of this invention is to provide a telescoping knife and fork implement which, as a matter of safety, provision is made for shielding the blade of the knife and the tines of the fork when the parts are not in use.

A further object is to provide an implement as above described in which the parts are so formed that when telescoped together they will form a completely enclosed unit protecting the working portions of the knife and fork.

A still further object is to provide for easy and thorough cleaning of the parts of the implement for maximum sanitation.

Further features and advantages of this invention will appear from a detailed description of the drawings in which:

FIG. 1 is a plan view of the telescoping knife and fork implement incorporating the features of this invention.

FIG. 2 is a side elevation of the implement shown in FIG. 1.

FIG. 3 is a plan view of the fork element of the implement.

FIG. 4 is a plan view of the knife element of the implement showing the handle portion swung away for dismantleing and cleaning.

FIG. 5 is an enlarged fragmentary section on the line 5—5 of FIG. 2.

FIG. 6 is an enlarged section on the line 6—6 of FIGS. 1 and 8.

FIG. 7 is an enlarged section on the line 7—7 of FIG. 1.

FIG. 8 is an enlarged plan view of the handle of the knife element of the implement.

FIG. 9 is an enlarged fragmentary section on the line 9—9 of FIG. 8.

FIG. 10 is an enlarged section on the line 10—10 of FIG. 8.

As an example of one embodiment of this invention there is shown an implement comprising a knife element 15 and a fork element 16. Each of the elements 15 and 16 comprises a handle piece 17 to which is suitably fixed the shank 18 of the knife blade 19 or fork 20.

Projecting outwardly from the inside face 21 of each handle piece 17 is a split pin 22 having the slit 23 so as to leave a divergent outwardly extending peripheral surface 24 which yieldingly engages in a slightly tapered mating bore 25 in swing piece 26. The piece 26 has a latch tongue 27 which is adapted to swing into the rectangular slot 28 of the raised latch piece 29 angularly disposed and integrally formed with the handle piece 17. It will be noted that the surface 30 of the rectangular slot 28 is tapered inwardly toward the handle piece 17 in a direction away from the split pivot pin 22 so that as the swing piece 26 is swung to closed position, FIGS. 1 and 8, the tongue 27 engages the surface 30 to firmly hold the inside face 21 of the handle piece 17 and the inside face 31 of the swing piece firmly together, the tapered bore 25 of the swing piece 26 cooperating with the tapered pin surface 24 to do likewise.

A recess 32 is formed in the inside face 31 of the swing piece 26 which is adapted to receive the respective knife blade 19 and the fork 20 when in swung closed position. The telescopic insertion of the members 15 and 16, one with the other, to present the knife blade 19 and the fork 20 in the recesses 32 automatically locks the swing pieces 26 against outward swinging movement. In addition, a detent projection 33 formed on the surface 21, FIG. 4, engages a mating detent notch 34 in the surface 31 to hold the swing piece 26 in swung closed position when the knife and fork elements are separated. When the elements 15 and 16 are pulled apart and separated, the swing pieces 26 may be swung open and lifted off of split pins 22 for easy and thorough cleaning of the faces 21 and 31 and the recesses 32. Further, the rectangular bore or slots 28 are easily accessible from both ends for easy cleaning. The fork element 16 is similarly constructed to that just described above.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. A telescoping knife and fork implement including in combination:
   (a) knife element having a knife blade,
   (b) fork element having fork tines,
   (c) a handle piece fixed to each of said elements including,
   (d) a swing piece pivotally mounted on the outer end of said handle piece and adjacent the inside face of said handle piece,
   (e) a raised latch piece formed integral with the inner end of said handle piece and projecting outwardly from said inside face of said handle piece and having a slot formed therein,
   (f) and a latch tongue on the outer swinging end of said swing piece adapted to engage said slot in said latch piece to hold said latch piece to said inside face of said handle piece when swung to closed aligned position therewith.

2. A telescoping knife and fork implement including in combination:
   (a) knife element having a knife blade,
   (b) fork element having fork tines,
   (c) a handle piece fixed to each of said elements including,
   (d) a swing piece pivotally mounted on the outer end of said handle piece and adjacent the inside face of said handle piece,
   (e) a raised latch piece formed integral with the inner end of said handle piece and projecting outwardly from said inside face of said handle piece and having a slot formed therein,
   (f) a latch tongue on the outer swinging end of said swing piece adapted to engage said slot in said latch piece to hold said latch piece to said inside face of said handle piece when swung to closed aligned position therewith,
   (g) and a recess formed in the inside face of said swing piece adapted to receive the knife blade and fork tines, said knife and fork elements being telescoped together.

3. A telescoping knife and fork implement including in combination:
   (a) knife element having a knife blade,
   (b) fork element having fork tines,
   (c) a handle piece fixed to each of said elements including,
   (d) a swing piece pivotally mounted on the outer end of said handle piece and adjacent the inside face of said handle piece, (e) a raised latch piece formed integral with the inner end of said handle piece and projecting outwardly from said inside face of said handle piece and having a slot formed therein, (f) a latch tongue on the outer swinging end of said swing piece adapted to engage said slot in said latch piece to hold said latch piece to said inside face of said handle piece when swung to closed aligned position therewith, (g) a recess formed in the inside face of said swing piece adapted to receive the knife blade and fork tines, said knife and fork elements being telescoped together, (h) and said swing piece being held in swung closed position by the engagement of said knife blade and fork tines with the sides of said recess.

4. A telescoping knife and fork implement including in combination:

(a) knife element having a knife blade, (b) fork element having fork tines, (c) a handle piece fixed to each of said elements including, (d) a swing piece pivotally mounted on the outer end of said handle piece and adjacent the inside face of said handle piece, (e) a raised latch piece formed integral with the inner end of said handle piece and projecting outwardly from said inside face of said handle piece and having a slot formed therein, (f) a latch tongue on the outer swinging end of said swing piece adapted to engage said slot in said latch piece to hold said latch piece to said inside face of said handle piece when swung to closed aligned position therewith, (g) a recess formed in the inside face of said swing piece adapted to receive the knife blade and fork tines, said knife and fork elements being telescoped together, (h) said swing piece being held in swung closed position by the engagement of said knife blade and fork tines with the sides of said recess, (i) said swing piece being demountable at its pivotal mounting on said handle piece when swung to open position relative thereto.

References Cited in the file of this patent

UNITED STATES PATENTS

| 719,208 | Garda | Jan. 27, 1903 |
| 2,191,276 | Gardner et al. | Feb. 20, 1940 |

FOREIGN PATENTS

| 518,152 | Great Britain | Feb. 19, 1940 |